(12) United States Patent
Li et al.

(10) Patent No.: US 12,120,031 B2
(45) Date of Patent: Oct. 15, 2024

(54) METHOD FOR BALANCING CROSS-DOMAIN BROADCAST NETWORK LOAD OF BLOCKCHAIN, COMPUTER DEVICE, AND NON-TRANSITORY COMPUTER-READABLE STORAGE MEDIUM

(71) Applicant: Hangzhou Qulian Technology Co., Ltd., Zhejiang (CN)

(72) Inventors: Wei Li, Zhejiang (CN); Weiwei Qiu, Zhejiang (CN); Maifang Hu, Zhejiang (CN); Fanglei Huang, Zhejiang (CN); Shuai Zhang, Zhejiang (CN)

(73) Assignee: Hangzhou Qulian Technology Co., Ltd., Hangzhou (CN)

( * ) Notice: Subject to any disclaimer, the term of this patent is extended or adjusted under 35 U.S.C. 154(b) by 445 days.

(21) Appl. No.: 17/637,090

(22) PCT Filed: Aug. 20, 2020

(86) PCT No.: PCT/CN2020/110193
§ 371 (c)(1),
(2) Date: Feb. 22, 2022

(87) PCT Pub. No.: WO2021/032153
PCT Pub. Date: Feb. 25, 2021

(65) Prior Publication Data
US 2022/0224648 A1  Jul. 14, 2022

(30) Foreign Application Priority Data
Aug. 22, 2019 (CN) .......................... 201910776147.2

(51) Int. Cl.
H04L 45/16 (2022.01)
H04L 9/32 (2006.01)
(Continued)

(52) U.S. Cl.
CPC .......... *H04L 47/125* (2013.01); *H04L 9/3236* (2013.01); *H04L 41/12* (2013.01);
(Continued)

(58) Field of Classification Search
CPC ........ H04L 9/3336; H04L 41/12; H04L 45/16
(Continued)

(56) References Cited

U.S. PATENT DOCUMENTS 8,185,616 B2   5/2012   Nagata et al.
9,755,854 B2   9/2017   Maeda et al.
(Continued)

FOREIGN PATENT DOCUMENTS

CN   101909004   12/2010
CN   108702331   10/2018
(Continued)

OTHER PUBLICATIONS

International Search Report and the Written Opinion Dated Nov. 26, 2020 From the International Searching Authority Re. Application No. PCT/CN2020/110193 and Its Translation of Search Report Into English. (10 Pages).

(Continued)

*Primary Examiner* — Dang T Ton

(57) ABSTRACT

A method for balancing a cross-domain broadcast network load of a blockchain includes is provided. By evenly distributing the load of cross-domain broadcasting to multiple cross-domain nodes, a utilization rate of a blockchain system can be increased, and ability of processing transactions in the blockchain can be improved. A computer device and a non-transitory computer-readable storage medium are further provided.

15 Claims, 4 Drawing Sheets

(51) Int. Cl.
*H04L 41/12* (2022.01)
*H04L 47/10* (2022.01)
*H04L 47/125* (2022.01)
*H04L 9/00* (2022.01)
*H04L 9/38* (2006.01)

(52) U.S. Cl.
CPC .............. *H04L 45/16* (2013.01); *H04L 47/15* (2013.01); *H04L 9/38* (2013.01); *H04L 9/50* (2022.05)

(58) Field of Classification Search
USPC ........................................ 370/329, 400, 405
See application file for complete search history.

(56) References Cited

U.S. PATENT DOCUMENTS

| | | |
|---|---|---|
| 10,148,551 B1 | 12/2018 | Wood |
| 10,164,875 B2 | 12/2018 | Guichard |
| 10,275,400 B1 | 4/2019 | Newman |
| 10,432,523 B2 | 10/2019 | Vairavakkalai et al. |
| 2017/0244628 A1 | 8/2017 | Chen et al. |
| 2018/0123948 A1 | 5/2018 | Lin |
| 2019/0163912 A1 | 5/2019 | Kumar et al. |
| 2019/0180406 A1 | 6/2019 | Yang et al. |
| 2023/0359714 A1* | 11/2023 | Cristache ............ G06F 3/04883 |

FOREIGN PATENT DOCUMENTS

| | | |
|---|---|---|
| CN | 108737370 | 11/2018 |
| CN | 108833277 | 11/2018 |
| CN | 108989212 | 12/2018 |
| CN | 109302296 | 2/2019 |
| CN | 109684087 | 4/2019 |
| CN | 110011930 | 7/2019 |
| CN | 110086713 | 8/2019 |
| JP | 2005-203885 | 7/2005 |
| JP | 2015-159486 | 9/2015 |
| JP | 2016-116024 | 6/2016 |
| JP | 2016-225729 | 12/2016 |
| JP | 2018-137641 | 8/2018 |
| WO | WO 2021/032153 | 2/2021 |

OTHER PUBLICATIONS

Notification of Office Action and Search Report Dated Mar. 1, 2021 From the State Intellectual Property Office of the People's Republic of China Re. Application No. 201910776147.2 and Its Translation of Office Action Into English. (8 Pages).

Neto et al. "An Approach Based on Ford-Fulkerson Algorithm to Optimize Network Bandwidth Usage", : Proceedings of the Brazilian Symposium on Computing Systems Engineering (SBESC): 76-79, Nov. 2015.

Qin English Abstract. "Adaptive Broadcast Routing Allocation Algorithm in Blockchain", Computer ApplicationsandSoftware, 36(8): 6P., Aug. 2019.

Rodrifues et al. "Multi-Domain DDOS Mitigation Based on Blockchains", AIMS LNCS 10356: 185-190, 2017.

Zhang et al. "Research on Cross-Domain; Routing and Resources; Optimizing of Middlebox in Software Defined-Networking", A Dissertion for Master's Degree, University of Science and Technology of China, May 2016. Chinese Document.

Decision to Grant a Patent Dated Mar. 1, 2023 From the Japan Patent Office Re. Application No. 2022-510088 and Its Translation Into English. (5 Pages).

Supplementary European Search Report Dated Aug. 22, 2023 From the European Patent Office Re. Application No. 20853845.4. (5 Pages).

Kan et al. "Boost Blockchain Broadcast Propagation With Tree Routing", Advances in Databases and Information Systems, XP047497151, SmartBlock 2018, LNCS 11373: 77-85, Dec. 7, 2018.

* cited by examiner

METHOD FOR BALANCING CROSS-DOMAIN BROADCAST NETWORK LOAD OF BLOCKCHAIN, COMPUTER DEVICE, AND NON-TRANSITORY COMPUTER-READABLE STORAGE MEDIUM

RELATED APPLICATIONS

This application is a National Phase of PCT Patent Application No. PCT/CN2020/110193 having International filing date of Aug. 20, 2020, which claims the benefit of priority of Chinese Patent Application No. 201910776147.2 filed on Aug. 22, 2019. The contents of the above applications are all incorporated by reference as if fully set forth herein in their entirety.

FIELD AND BACKGROUND OF THE INVENTION

The present disclosure relates to the field of blockchain technology, in particular to a method and a system for balancing a cross-domain broadcast network load of a blockchain, a computer device, and a readable storage medium.

Blockchain is a new type of decentralized protocol which can safely store digital currency transactions or other data, and information cannot be forged or tampered with. Transaction confirmation in the blockchain is completed by all nodes on the blockchain, and its consistency is guaranteed by a consensus algorithm. By maintaining the same ledger by all nodes together, it can be ensured that the information in the blockchain cannot be tampered with, and the integrity of the data can still be maintained even when a node is worse.

When a master node receives a transaction, it needs to broadcast information of the transaction to all other nodes in the blockchain to jointly complete confirmation of the transaction. Since the blockchain may involve a plurality of institutions at the same time, hosts of the same institution are in the same network domain and can directly transmit messages. However, hosts of different institutions are often not in the same network domain, and cross-domain hosts are required to forward messages for communications. A cross-domain host is configured with a plurality of network domains at the same time. Each of the network domains has an IP address indicating a communication IP used by a node in the network domain.

Currently, cross-domain forwarding is mainly achieved by configuring static cross-domain hosts, which causes excessive network load on individual cross-domain hosts, thereby increasing delay of message broadcast, affecting efficiency of transaction confirmation, and reducing ability of processing transactions in the blockchain.

SUMMARY OF THE INVENTION

According to various embodiments of the present disclosure, a method for balancing a cross-domain broadcast network load of a blockchain is provided. The method includes steps S1-S6:

S1, receiving information of network domains where all hosts in the blockchain are located and inputted by a user is received, and using the information to generate a network topology involved in cross-domain forwarding, wherein nodes in the network topology are the hosts in a network of the blockchain, and a connection line between two of the nodes indicates that two corresponding ones of the hosts exist in the same network domain;

S2, establishing a new network topology, wherein a number of the nodes in the network topology is defined as N, one of the hosts sending a broadcast message is a master node, each of the nodes in the network topology except the master node is split into two nodes which are respectively called as an ingress node of a corresponding node and an egress node of the corresponding node, and a connection line with capacity C is connected from the ingress node of the corresponding node to the egress node of the corresponding node; then, a connection line between two of the nodes in the original network topology is split into two directed connection lines, each direction is from the egress node of one of the original nodes to the ingress node of another node, and capacity is N−1; when a connection line exists between the master node in the original network and one of other nodes, and the connection line is transformed into a connection line with capacity N−1 from the master node to the ingress node of the one of the other nodes; then, a virtual node is added, and a connection line with capacity 1 between the egress node of each of the nodes to the virtual node is added to form the new network topology; and C=(L+U)/2, L represents a lower bound of an edge capacity, U represents an upper bound of the edge capacity, an initial value of L is 0, and an initial value of U is N−1;

S3, calculating a maximum flow f from the master node to the virtual node in the new network topology by a Ford-Fulkerson maximum flow algorithm; when f=N−1, updating U=C; and otherwise, updating L=C and calculating a value of C again;

S4, when U−L≤1, controlling C=U to be as a minimum network load of a corresponding one of the nodes and continuing to perform S5; and otherwise, returning to S3;

S5, performing, according to the value of C in S4, augmenting path searches with capacity 1 for N−1 times from the master node to the virtual node in the new network topology, removing the virtual node in a search path, merging the ingress node and the egress node, and using a final path as a routing path of the broadcast message from the master node to a target node; and S6, when the master node needs to send a message to the target node located in another domain, the master node appends a path to an end of the message and sends the message to a first node in the path; when a node located in the path receives the message, the node checks whether the message contains information of the path; when the message contains the information of the path, a next node in the path is found out and the message is sent to the next node; and when the target node receives the message, the target node finds out that it is a last node in the path and processes content of the message.

In an embodiment, in S1, the information of the network domains is stored in a configuration file in a form of network domains or IP addresses; and when a network domain of at least one of the nodes changes, the information of the network domains is updated by changing the configuration file.

In an embodiment, in S5, a stored form of a calculated forwarding path is node name: node name.

According to various embodiments of the present disclosure, a method for balancing a cross-domain broadcast network load of a blockchain is further provided. The method includes the following steps: receiving information of network domains where all hosts in the blockchain are located, and generating a first network topology involved in cross-domain forwarding according to the information of the network domains, wherein nodes in the first network topology are the hosts in the blockchain, and a connection line between two of the nodes indicates that two corresponding ones of the hosts exist in the same network domain; serving one of the hosts sending a broadcast message as a master node, splitting each of the nodes in the first network topology except the master node into an ingress node of a corresponding node and an egress node of the corresponding node, and connecting a connection line from the ingress node of the corresponding node to the egress node of the corresponding node; splitting a connection line between two of the nodes in the first network topology into two directed connection lines, wherein each direction is from the egress node of one of the two of the nodes to the ingress node of the other of the two of the nodes, and capacity is N−1; when a connection line exists between the master node in the first network and one of other nodes, the connection line is transformed into a connection line with capacity N−1 from the master node to the ingress node of the one of the other nodes; and adding a virtual node, and adding a connection line with capacity 1 between the egress node of each of the nodes to the virtual node to form a second network topology; performing, according to capacity C of a connection between two corresponding ones of the nodes, augmenting path searches with capacity 1 for N−1 times from the master node to the virtual node in the second network topology to obtain a search path, wherein N is a number of the nodes in the first network topology; and the virtual node in the search path is removed, and the ingress node of the corresponding node and the egress node of the corresponding node are merged to obtain a routing path of the broadcast message from the master node to a target node; and sending, when the master node needs to send a message to the target node located in another domain, the message to the target node according to the routing path for processing.

In an embodiment, $C=(L+U)/2$, L represents a lower bound of an edge capacity, U represents an upper bound of the edge capacity, an initial value of L is 0, and an initial value of U is N−1; before the performing, according to the capacity C of the connection between the two corresponding ones of the nodes, augmenting path searches with capacity 1 for N−1 times from the master node to the virtual node in the second network topology, the method includes the following steps: obtaining a maximum flow f from the master node to the virtual node in the second network topology; updating, when f=N−1, U=C; otherwise, updating L=C; and calculating a value of C again according to $C=(L+U)/2$; and controlling, when $U-L \leq 1$, C=U to be as a minimum network load of a corresponding one of the nodes; and otherwise, performing the step of obtaining the maximum flow f from the master node to the virtual node in the second network topology.

In an embodiment, the sending the message to the target node according to the routing path for processing includes the following steps: appending the routing path to an end of the message by the master node and sending the message to a first node in the routing path; when a node located in the path receives the message, the node checks whether the message contains the routing path; if yes, a next node in the routing path is obtained and the message is sent to the next node; and when the target node receives the message and the target node finds out that it is a last node in the routing path, the target node processes content of the message.

According to various embodiments of the present disclosure, a method for balancing a cross-domain broadcast network load of a blockchain is further provided. The method includes the following steps: receiving a message, and checking whether the message contains the above-mentioned routing path; and if yes, a next node of a current node in the routing path is obtained, and the message is sent to the next node.

According to various embodiments of the present disclosure, a method for balancing a cross-domain broadcast network load of a blockchain is further provided. The method includes the following steps: receiving a message, and checking whether the message contains the above-mentioned routing path; and if yes and a current node is a last node in the routing path, content of the message is processed.

In an embodiment, the information of the network domains is stored in a configuration file in a form of network domains or IP addresses; and when a network domain of at least one of the nodes changes, the information of the network domains is updated by changing the configuration file.

In an embodiment, a stored form of the routing path is node name: node name.

According to various embodiments of the present disclosure, a system for balancing a cross-domain broadcast network load of a blockchain is further provided. The system includes: a first topology generating module, a node splitting module, a second topology generating module, a path obtaining module, and a message sending module.

The first topology generating module configured to: receive information of network domains where all hosts in the blockchain are located; and generate a first network topology involved in cross-domain forwarding according to the information of the network domains, wherein nodes in the first network topology are the hosts in the blockchain, and a connection line between two of the nodes indicates that two corresponding ones of the hosts exist in the same network domain.

The node splitting module configured to: serve one of the hosts sending a broadcast message as a master node; split each of the nodes in the first network topology except the master node into an ingress node of a corresponding node and an egress node of the corresponding node; and connect a connection line from the ingress node of the corresponding node to the egress node of the corresponding node.

The second topology generating module configured to: split a connection between two of the nodes in the first network topology into two directed connection lines, wherein each direction is from the egress node of one of the two of the nodes to the ingress node of the other of the two of the nodes, and capacity is N−1; transform, when a connection line exists between the master node in the first network and one of other nodes, into a connection line with capacity N−1 from the master node to the ingress node of the other of the two of the nodes; and add a virtual node and add a connection line with capacity 1 between the egress node of each of the nodes to the virtual node to form a second network topology.

The path obtaining module configured to: perform, according to capacity C of a connection between two corresponding ones of the nodes, augmenting path searches with capacity 1 for N−1 times from the master node to the virtual node in the second network topology to obtain a search path, wherein N is a number of the nodes in the first network topology; and remove the virtual node in the search path, and merge the ingress node of the corresponding node and the egress node of the corresponding node to obtain a routing path of the broadcast message from the master node to a target node.

The message sending module configured to send, when the master node needs to send a message to the target node located in another domain, the message to the target node according to the routing path for processing.

According to various embodiments of the present disclosure, a computer device is further provided and includes a memory and a processor. The memory stores computer programs. The processor is configured to execute the computer programs to implement steps in any one of the above-mentioned methods for balancing the cross-domain broadcast network load of the blockchain.

According to various embodiments of the present disclosure, a computer-readable storage medium is further provided and includes computer programs stored thereon. The computer programs are executed by a processor to implement steps in any one of the above-mentioned methods for balancing the cross-domain broadcast network load of the blockchain.

BRIEF DESCRIPTION OF THE SEVERAL VIEWS OF THE DRAWINGS

In order to better describe and illustrate embodiments and/or examples of the present disclosure herein, one or more drawings may be referred to. The additional details or examples used to describe the drawings should not be considered as limiting the scope of the present disclosure, the currently described embodiments and/or examples, and the best mode of the present disclosure currently understood.

DESCRIPTION OF SPECIFIC EMBODIMENTS OF THE INVENTION

Figure 1:
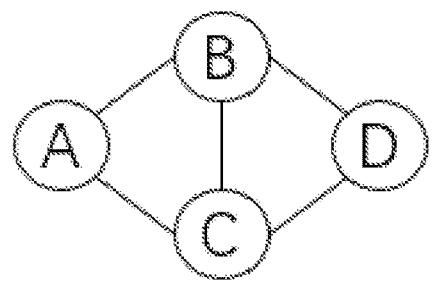
FIG. 1 illustrates a network topology diagram involved in cross-domain forwarding according to an embodiment of the present disclosure.

In order to facilitate the understanding of the present disclosure and to make the above-mentioned objectives, features and advantages of the present disclosure more obvious and understandable, specific embodiments of the present disclosure are described in detail below with reference to the accompanying drawings. In the following description, many specific details are explained in order to fully understand the present disclosure, and preferred embodiments of the present disclosure are shown in the accompanying drawings. However, the present disclosure can be implemented in many different forms and is not limited to the embodiments described herein. On the contrary, the purpose of providing these embodiments is to make the understanding of the content of the present disclosure more thorough and comprehensive. The present disclosure can be implemented in many other ways different from those described herein, and those skilled in the art can make similar improvements without violating the connotation of the present disclosure. Therefore, the present disclosure is not limited by the specific embodiments disclosed below.

Furthermore, the terms "first" and "second" are for descriptive purposes only and should not be construed as indicating or implying relative importance or implying the number of technical features. As such, the features defined by the term "first" and "second" may include the at least one feature explicitly or implicitly. In the description of the present disclosure, "more" refers to at least two, such as two, three and so on, unless otherwise specifically defined. In the description of the present disclosure, "several" refers to at least one, such as one, two and so on, unless otherwise specifically defined.

Unless otherwise defined, all technical and scientific terms used herein have the same meaning as commonly understood by those skilled in the technical field of the present disclosure. The terminology used herein is only for the purpose of describing specific embodiments and is not intended to limit the present disclosure. The term "and/or" as used herein includes any and all combinations of one or more related listed items.

As shown in FIGS. 1-4, a method for balancing a cross-domain broadcast network load of a blockchain is provided. The method specifically includes the following steps S1-S6.

In S1, information of network domains where all hosts in the blockchain and inputted by a user is received, and the information is used to generate a network topology involved in cross-domain forwarding, wherein nodes in the network topology are the hosts in a network of the blockchain, and a connection line between two of the nodes indicates that two corresponding ones of the hosts exist in the same network domain.

In S2, a new network topology is established

A number of the nodes in the network topology is defined as N, one of the hosts sending a broadcast message is a master node, each of the nodes in the network topology except the master node is split into two nodes which are respectively called as an ingress node of a corresponding node and an egress node of the corresponding node, and a connection line with capacity C is connected from the ingress node of the corresponding node to the egress node of the corresponding node; then, a connection line between two of the nodes in the original network topology is split into two directed connection lines, each direction is from the egress node of one of the original nodes to the ingress node of another node, and capacity is N−1; when a connection line exists between the master node in the original network and one of other nodes, and the connection line is transformed into a connection line with capacity N−1 from the master node to the ingress node of the one of the other nodes; then, a virtual node is added, and a connection line with capacity 1 between the egress node of each of the nodes to the virtual node is added to form a new network topology; and C=(L+U)/2, L represents a lower bound of an edge capacity, U represents an upper bound of the edge capacity, an initial value of L is 0, and an initial value of U is N−1.

In S3, a maximum flow f from the master node to the virtual node in the new network topology is calculated by a Ford-Fulkerson maximum flow algorithm; when f=N−1, updating U=C; and otherwise, updating L=C and calculating a value of C again.

In S4, when U−L≤1, controlling C=U to be as a minimum network load of a corresponding one of the nodes and continuing to perform S5; and otherwise, returning to S3.

In S5, augmenting path searches with capacity 1 are performed, according to the value of C in S4, for N−1 times from the master node to the virtual node in the new network topology, the virtual node in a search path is removed, the ingress node and the egress node are merged, and a final path is used as a routing path of the broadcast message from the master node to a target node.

In S6, when the master node needs to send a message to the target node located in another domain, the master node appends a path to an end of the message and sends the message to a first node in the path; when a node located in the path receives the message, the node checks whether the message contains information of the path; when the message contains the information of the path, a next node in the path is found out and the message is sent to the next node; and when the target node receives the message, the target node finds out that it is a last node in the path and processes content of the message.

In S6, by adding the forwarding path to the end of the message, the forwarding node does not need to calculate how to send the message to the target node, but only needs to check the information of the path and send the message to the next forwarding node. This can alleviate burden of calculating paths for intermediate nodes.

Preferably, in S1, the information of the network domains is stored in a configuration file in a form of network domains or IP addresses. When a network domain of at least one of the nodes changes, the information of the network domains is updated by changing the configuration file.

Preferably, in S5, a stored form of a calculated forwarding path is node name: node name. When a node in the path changes its IP address, there is no need to modify the forwarding path, and a previous forwarding path is still used for data packet forwarding.

Figure 2:
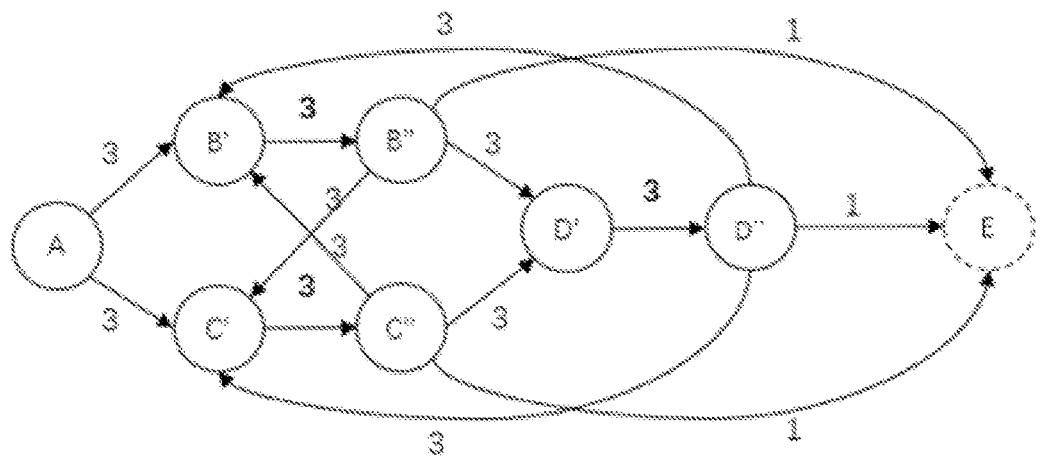
FIG. 2 illustrates a new network topology diagram obtained by performing node splitting and adding traffic information according to an embodiment of the present disclosure.

An original network topology shown in FIG. 1 is an undirected graph. Nodes A-D represent hosts in a network. A is a master node and located in a network domain 1. B and C are cross-domain hosts and located in the network domain 1 and a network domain 2. D is a normal host and located in the network domain 2. A connection line means that two corresponding hosts are in the same domain and can be directly connected by IP addresses. FIG. 2 illustrates a new network topology. The new network topology is a directed graph. It can be seen by comparing FIG. 1 with FIG. 2 that the node B is split into two nodes B' and B". An edge with capacity C (a value is 3) is directly connected between B' and B". An edge from A to B in FIG. 1 is transformed into a directed edge with capacity 3 from A to B'. In FIG. 1, an edge from C to B is split into two directed edges with capacity 3 from C" to B' and from B" to C'. A virtual node E is added. A directed edge with capacity 1 is connected between each of B", C", and D" and E.

Figure 3:
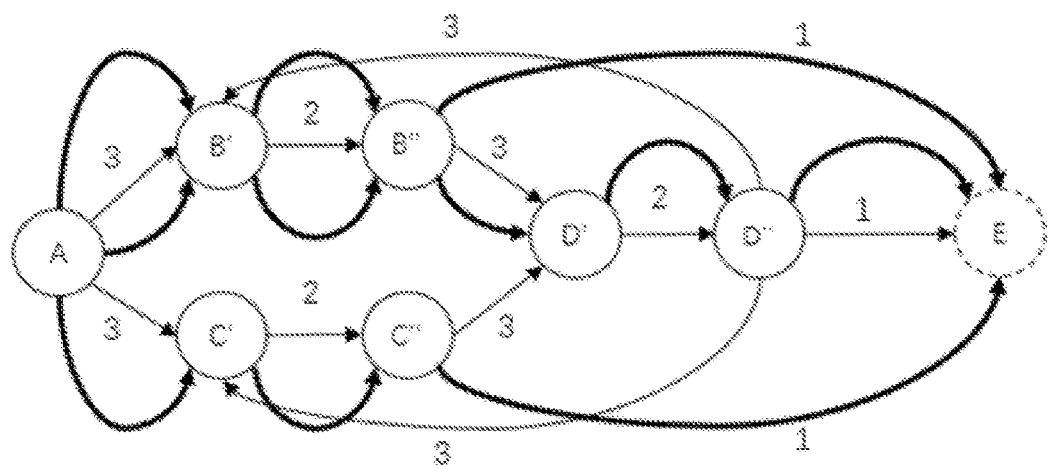
FIG. 3 illustrates a schematic diagram of a feasible flow from A to E when C=2 according to an embodiment of the present disclosure.

FIG. 3 illustrates a schematic diagram of a maximum flow from A to E in the new network topology when C=2. A maximum flow from A to E calculated by the Ford-Fulkerson maximum flow algorithm is 3 and represented by bold lines. When C=1, it can be calculated that the maximum flow from A to E is 2. That is, A cannot broadcast a message to the three nodes B, C, and D at the same time. Therefore, a minimum load of processing a broadcast message by a cross-domain host is 2.

Figure 4:
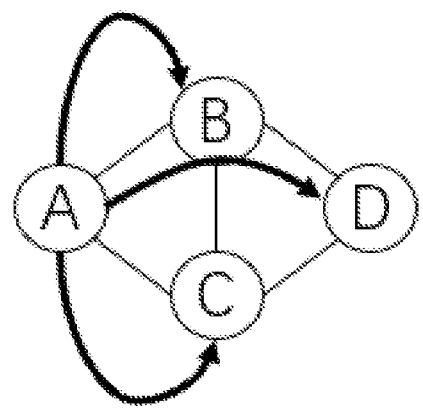
FIG. 4 illustrates a schematic diagram of paths selected by a master node A to broadcast a message to nodes B, C, and D node according to an embodiment of the present disclosure.

FIG. 4 illustrates data packet forwarding paths to the nodes B, C, and D for cross-domain broadcast selected by the node A. A message from A to B or from A to C is directly sent through the network domain 1. A message from A to D is forwarded cross domains through the node B.

Figure 5:
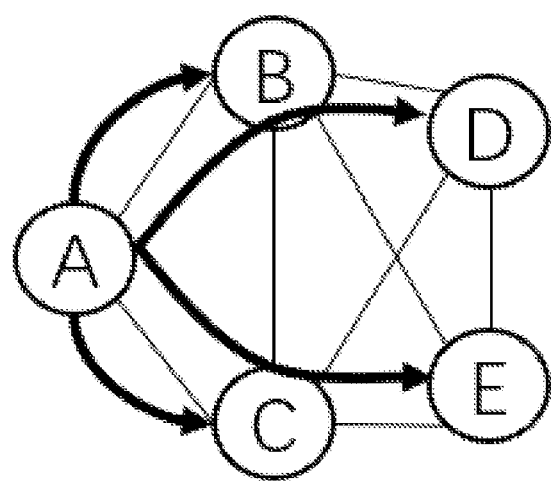
FIG. 5 illustrates a schematic diagram of path selected by the master node A to broadcast a message to nodes B, C, D, and E node according to an embodiment of the present disclosure.

FIG. 5 illustrates new cross-domain broadcast forwarding paths obtained by A through the present method when a new node E located in the network domain 2 joins the blockchain. A message from A to B or from A to C is directly sent through the network domain 1. A message from A to D is forwarded cross domains through the node B. A message from A to E is forwarded cross domains through the node C. At this time, the network load of each of the nodes B and C is 2, and the network load caused by cross-domain broadcast is equally shared.

The present disclosure is applied to a blockchain platform. When the master node sends a broadcast message to other blockchain nodes, a situation that a performance bottleneck is generated because some nodes undertake cross-domain forwarding tasks and the network load is too heavy does not occur. In the meantime, by evenly distributing the load of cross-domain broadcast to multiple cross-domain nodes, a utilization rate of a blockchain system can be increased.

Figure 6:
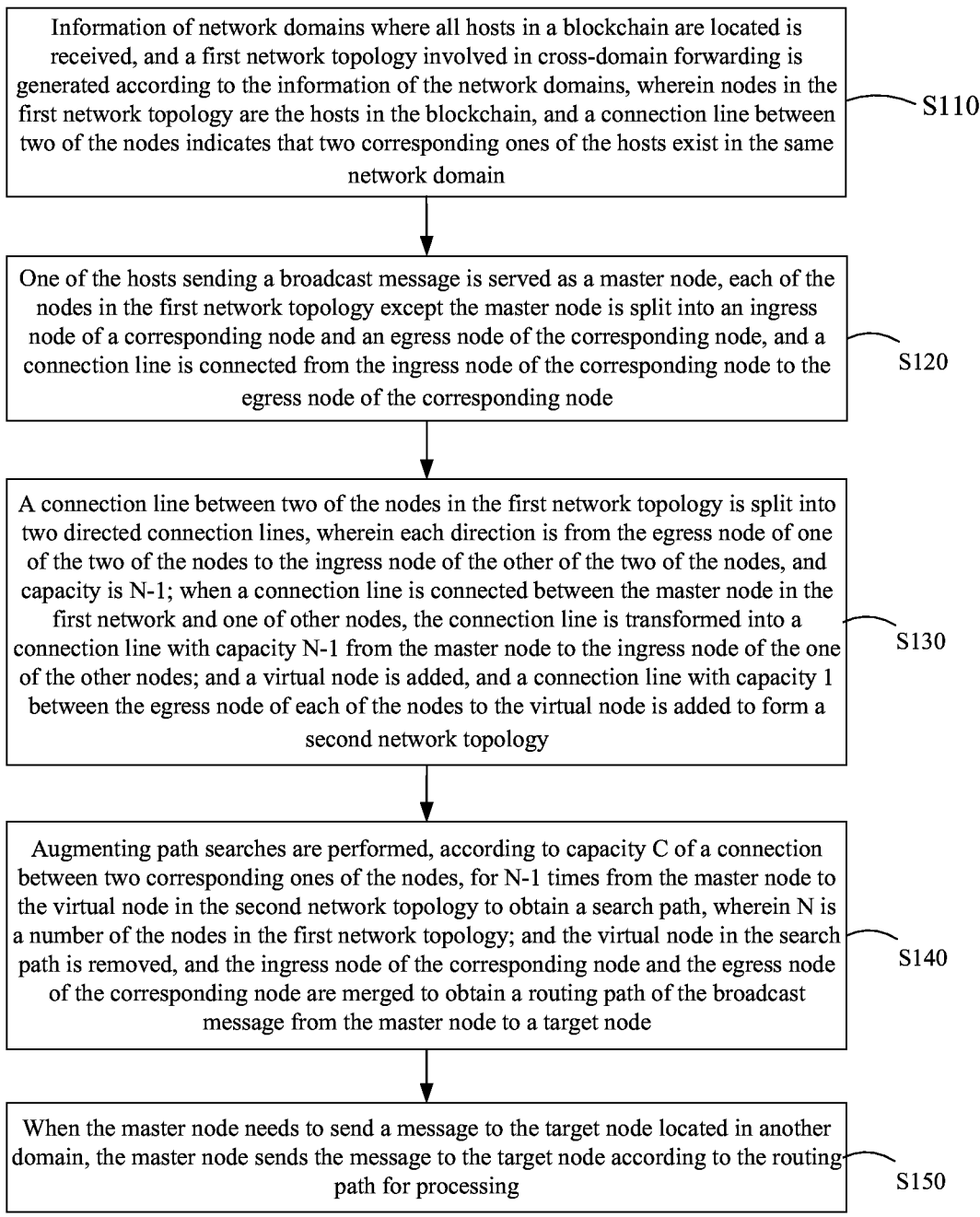
FIG. 6 illustrates a flowchart of a method for balancing a cross-domain broadcast network load of a blockchain according to an embodiment of the present disclosure.

Further, as shown in FIG. 6, the following scheme can be adopted to realize a method for balancing a cross-domain broadcast network load of a blockchain including steps S110-S150.

In S110, information of network domains where all hosts in a blockchain are located is received, and a first network topology involved in cross-domain forwarding is generated according to the information of the network domains, wherein nodes in the first network topology are the hosts in the blockchain, and a connection line between two of the nodes indicates that two corresponding ones of the hosts exist in the same network domain.

In S120, one of the hosts sending a broadcast message is served as a master node, each of the nodes in the first network topology except the master node is split into an ingress node of a corresponding node and an egress node of the corresponding node, and a connection line is connected from the ingress node of the corresponding node to the egress node of the corresponding node.

In S130, a connection line between two of the nodes in the first network topology is split into two directed connection lines, wherein each direction is from the egress node of one of the two of the nodes to the ingress node of the other of the two of the nodes, and capacity is N−1; when a connection line is connected between the master node in the first network and one of other nodes, the connection line is transformed into a connection line with capacity N−1 from the master node to the ingress node of the one of the other nodes; and a virtual node is added, and a connection line with capacity 1 between the egress node of each of the nodes to the virtual node is added to form a second network topology.

In S140, augmenting path searches are performed, according to capacity C of a connection between two corresponding ones of the nodes, for N−1 times from the master node to the virtual node in the second network topology to obtain a search path, wherein N is a number of the nodes in the first network topology; and the virtual node in the search path is removed, and the ingress node of the corresponding node and the egress node of the corresponding node are merged to obtain a routing path of the broadcast message from the master node to a target node.

In S150, when the master node needs to send a message to the target node located in another domain, the master node sends the message to the target node according to the routing path for processing.

In an embodiment, $C=(L+U)/2$. L represents a lower bound of an edge capacity. U represents an upper bound of the edge capacity. An initial value of L is 0. An initial value of U is N−1. Before the augmenting path searches are performed, according to the capacity C of the connection between the two corresponding ones of the nodes, for N−1 times from the master node to the virtual node in the second network topology, the method further includes the following steps: obtaining a maximum flow f from the master node to the virtual node in the second network topology; updating, when $f=N-1$, $U=C$; otherwise, updating $L=C$; and calculating a value of C again according to $C=(L+U)/2$; and controlling, when $U-L\le 1$, $C=U$ to be as a minimum network load of a corresponding one of the nodes; and otherwise, performing the step of obtaining the maximum flow f from the master node to the virtual node in the second network topology.

In an embodiment, the sending the message to the target node according to the routing path for processing includes the following steps: appending the routing path to an end of the message by the master node and sending the message to a first node in the routing path; when the node located in the path receives the message, the node checks whether the message contains the routing path; if yes, a next node in the path is obtained and the message is sent to the next node; and when the target node receives the message and the target node finds out that it is a last node in the routing path, the target node processes content of the message.

In an embodiment, a method for balancing a cross-domain broadcast network load of a blockchain is provided. The method includes the following steps: receiving a message, and checking whether the message contains the above-mentioned routing path; and if yes and a current node is a last node in the routing path, content of the message is processed.

In the present embodiment, the method for balancing the cross-domain broadcast network load of the blockchain can be executed by any node in the blockchain and can function to receive and forward the message.

In an embodiment, a method for balancing a cross-domain broadcast network load of a blockchain is provided. The method includes the following steps: receiving a message, and checking whether the message contains the above-mentioned routing path; and if yes and a current node is a last node in the routing path, content of the message is processed.

In the present embodiment, the method for balancing the cross-domain broadcast network load of the blockchain can be executed by any node in the blockchain, and the target node can function to receive and process the message.

In an embodiment, the information of the network domains is stored in a configuration file in a form of network domains or IP addresses. When a network domain of at least one of the node changes, the information of the network domains is updated by changing the configuration file.

In an embodiment, a stored form of the routing path is node name: node name.

Figure 7:
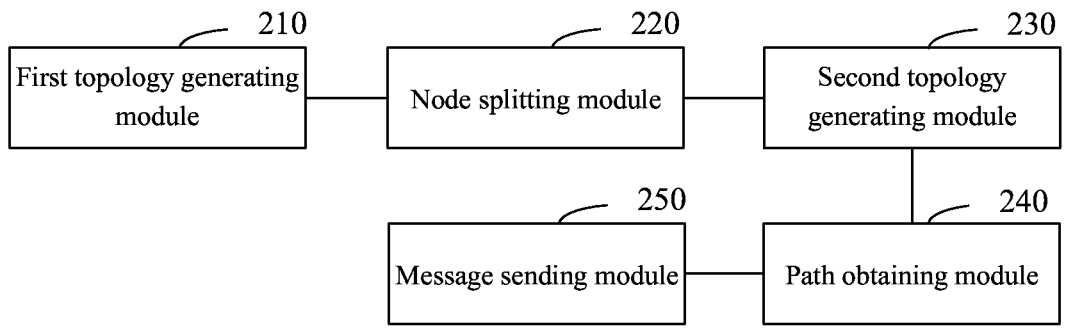
FIG. 7 illustrates a schematic structure diagram of a system for balancing a cross-domain broadcast network load of a blockchain according to an embodiment of the present disclosure.

In an embodiment, as shown in FIG. 7, a system for balancing a cross-domain broadcast network load of a blockchain is provided and includes: a first topology generating module 210, a node splitting module 220, a second topology generating module 230, a path obtaining module 240, and a message sending module 250.

The first topology generation module 210 is configured to: receive information of network domains where all hosts in a blockchain are located; and generate a first network topology involved in cross-domain forwarding according to the information of the network domains, wherein nodes in the first network topology are the hosts in the blockchain, and a connection line between two one of the nodes indicates that two corresponding ones of the hosts exist in the same network domain.

The node splitting module 220 is configured to: serve one of the hosts sending a broadcast message as a master node; split each of the nodes in the first network topology except the master node into an ingress node of a corresponding node and an egress node of the corresponding node; and connect a connection line from the ingress node of the corresponding node to the egress node of the corresponding node.

The second topology generating module 230 is configured to: split a connection between two of the nodes in the first network topology into two directed connection lines, wherein each direction is from the egress node of one of the two of the nodes to the ingress node of the other of the two of the nodes, and capacity is N−1; transform, when a connection line is connected between the master node in the first network and one of other nodes, a connection line with capacity N−1 from the master node to the ingress node of the other of the two of the nodes; and add a virtual node and add a connection line with capacity 1 between the egress node of each of the nodes to the virtual node to form a second network topology.

The path obtaining module 240 is configured to: perform, according to capacity C of a connection between two corresponding ones of the nodes, augmenting path searches with capacity 1 for N−1 times from the master node to the virtual node in the second network topology to obtain a search path, wherein, N is a number of the nodes in the first network topology; and remove the virtual node in the search path, and merge the ingress node of the corresponding node and the egress node of the corresponding node to obtain a routing path of the broadcast message from the master node to a target node.

The message sending module 250 is configured to send, when the master node needs to send a message to the target node located in another domain, the message to the target node according to the routing path for processing.

In an embodiment, $C=(L+U)/2$. L represents a lower bound of an edge capacity. U represents an upper bound of the edge capacity. An initial value of L is 0. An initial value of U is N−1. The path obtaining module 240 is further configured to: obtain a maximum flow f from the master node to the virtual node in the second network topology; update, when $f=N-1$, $U=C$; otherwise, update $L=C$; and calculate a value of C again according to $C=(L+U)/2$; and control, when $UL\le 1$, $C=U$ to be as a minimum network load of a corresponding one of the nodes; and otherwise, re-obtain the maximum flow f from the master node to the virtual node in the second network topology.

In an embodiment, the message sending module 250 is further configured to: append the routing path to an end of the message, and send the message to a first node in the routing path through the master node; receive the message through a node in the path, and check whether the message contains the routing path; if yes, a next node in the routing path is obtained and the message is sent to the next node; and receive the message through the target node, and process content of the message after it is determined that the target node is a last node in the routing path.

In an embodiment, the information of the network domains is stored in a configuration file in a form of network domains or IP addresses. When a network domain of at least one of the nodes changes, the information of the network domains is updated by changing the configuration file.

In an embodiment, a stored form of the routing path is node name: node name.

Specific embodiments of the system for balancing the cross-domain broadcast network load of the blockchain can be referred to description of the above-mentioned embodiments of the method for balancing the cross-domain broadcast network load of the blockchain and are not repeated herein. The various modules in the system for balancing the cross-domain broadcast network load of the blockchain can be implemented in whole or in part by software, hardware, and a combination thereof. The above-mentioned modules can be embedded in a form of hardware or independent of a processor in a computer device, or can be stored in a memory of the computer device in a form of software, so that the processor can call and execute operations corresponding to the above-mentioned modules.

Figure 8:
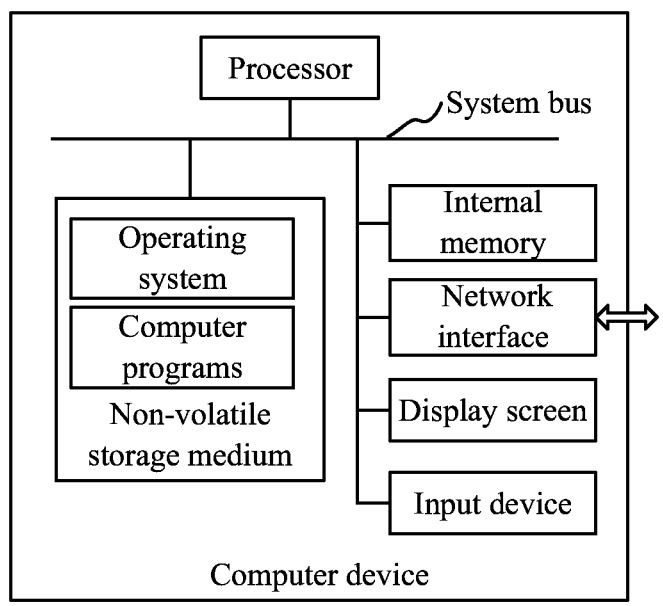
FIG. 8 illustrates an internal structure diagram of a computer device according to an embodiment of the present disclosure.

In an embodiment, a computer device is provided. The computer device can be a terminal, and its internal structure diagram can be as shown in FIG. 8. The computer device includes a processor, a memory, a network interface, a display screen, and an input device connected through a system bus. The processor of the computer device is configured to provide calculation and control capabilities. The memory of the computer device includes a non-volatile storage medium and an internal memory. The non-volatile storage medium stores an operating system and computer programs. The internal memory provides an environment for operations of the operating system and the computer programs in the non-volatile storage medium. The network interface of the computer device is configured to communicate with an external terminal through a network connection. The computer programs are executed by the processor to implement a method for balancing a cross-domain broadcast network load of a blockchain. The display screen of the computer device can be a liquid crystal display screen or an electronic ink display screen. The input device of the computer device can be a touch layer covered on the display screen, or can be a button, trackball, or touchpad disposed on a housing of the computer device, or can also be an external keyboard, touchpad, mouse or the like.

Those skilled in the art can understand that the structure shown in FIG. 8 is only a block diagram of a part of the structure related to solutions of the present disclosure, and does not constitute a limitation on the computer device to which the solutions of the present disclosure are applied. The computer device can specifically include more or fewer components than the components shown in the drawing, or combine certain components, or have a different component arrangement.

In an embodiment, a computer device is provided and includes a memory and a processor. The memory stores computer programs. The processor is configured to execute the computer programs to implement steps in the above-mentioned method for balancing the cross-domain broadcast network load of the blockchain.

In an embodiment, a computer-readable storage medium is provided and includes computer programs stored thereon. The computer programs are executed by a processor to implement steps in the above-mentioned method for balancing the cross-domain broadcast network load of the blockchain.

Those skilled in the art can understand that all or part of procedures in the above-mentioned embodiment methods can be implemented by instructing relevant hardware through computer programs. The computer programs can be stored in a non-volatile computer-readable storage medium. When the computer programs are executed, the procedures in the above-mentioned method embodiments can be includes. Any reference to a memory, a storage, a database, or other media used in the embodiments provided by the present disclosure can include a non-volatile and/or volatile memory. The non-volatile memory can include a read-only memory (ROM), a programmable ROM (PROM), an electrically programmable ROM (EPROM), an electrically erasable programmable ROM (EEPROM), or a flash memory. The volatile memory can include a random access memory (RAM) or an external cache memory. As an illustration rather than a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchronous chain channel (Synchlink) DRAM (SLDRAM), a memory bus (Rambus) direct RAM (RDRAM), a direct memory bus dynamic RAM (DRDRAM), a memory bus dynamic RAM (RDRAM) or the like.

Technical features of the above-mentioned embodiments can be combined arbitrarily. In order to make the description concise, all possible combinations of various technical features in the above-mentioned embodiments are not described. However, as long as the combinations of these technical features do not contradict, they should be regarded as the scope of the present disclosure.

The above-mentioned embodiments only express several embodiments of the present disclosure. Their description is more specific and detailed, but they cannot be understood as a limitation on the scope of the present disclosure. It should be pointed out that for those skilled in the art, modifications and improvements can be made without departing from the concept of the present disclosure, and these all fall within the protection scope of the present disclosure. Therefore, the protection scope of the present disclosure should be subject to the appended claims.

What is claimed is:

1. A method for balancing a cross-domain broadcast network load of a blockchain, comprising:
   receiving information of network domains where all hosts in the blockchain are located, and generating a first network topology involved in cross-domain forwarding according to the information of the network domains, wherein nodes in the first network topology are the hosts in the blockchain, and a connection line between two of the nodes indicates that two corresponding ones of the hosts exist in the same network domain;
   serving one of the hosts sending a broadcast message as a master node, splitting each of the nodes in the first network topology except the master node into an ingress node of a corresponding node and an egress node of the corresponding node, and connecting a connection line from the ingress node of the corresponding node to the egress node of the corresponding node;

splitting a connection line between two of the nodes in the first network topology into two directed connection lines, wherein each direction is from the egress node of one of the two of the nodes to the ingress node of the other of the two of the nodes, and capacity is N−1; when a connection line exists between the master node in the first network and one of other nodes, the connection line is transformed into a connection line with capacity N−1 from the master node to the ingress node of the one of the other nodes; and adding a virtual node, and adding a connection line with capacity 1 between the egress node of each of the nodes to the virtual node to form a second network topology;

performing, according to capacity C of a connection between two corresponding ones of the nodes, augmenting path searches with capacity 1 for N−1 times from the master node to the virtual node in the second network topology to obtain a search path, wherein N is a number of the nodes in the first network topology; and the virtual node in the search path is removed, and the ingress node of the corresponding node and the egress node of the corresponding node are merged to obtain a routing path of the broadcast message from the master node to a target node; and sending, when the master node needs to send a message to the target node located in another domain, the message to the target node according to the routing path for processing.

2. The method for balancing the cross-domain broadcast network load of the blockchain of claim 1, wherein C=(L+U)/2, L represents a lower bound of an edge capacity, U represents an upper bound of the edge capacity, an initial value of L is 0, and an initial value of U is N−1;

before the performing, according to the capacity C of the connection between the two corresponding ones of the nodes, augmenting path searches with capacity 1 for N-1 times from the master node to the virtual node in the second network topology, the method comprises:

obtaining a maximum flow f from the master node to the virtual node in the second network topology; updating, when f=N−1, U=C; otherwise, updating L=C; and calculating a value of C again according to C=(L+U)/2; and controlling, when U−L≤1, C=U to be as a minimum network load of a corresponding one of the nodes; and otherwise, performing the step of obtaining the maximum flow f from the master node to the virtual node in the second network topology.

3. The method for balancing the cross-domain broadcast network load of the blockchain of claim 1, wherein the sending the message to the target node according to the routing path for processing comprises:

appending the routing path to an end of the message by the master node and sending the message to a first node in the routing path;

when a node located in the path receives the message, the node checks whether the message contains the routing path; and if yes, a next node in the routing path is obtained and the message is sent to the next node; and when the target node receives the message and the target node finds out that it is a last node in the routing path, the target node processes content of the message.

4. The method for balancing the cross-domain broadcast network load of the blockchain of claim 1, wherein the information of the network domains is stored in a configuration file in a form of network domains or IP addresses; and when a network domain of at least one of the nodes changes, the information of the network domains is updated by changing the configuration file.

5. The method for balancing the cross-domain broadcast network load of the blockchain of claim 1, wherein a stored form of the routing path is node name: node name.

6. A computer device, including a memory and a processor, the memory storing computer programs, wherein the processor is configured to execute the computer programs to implement:

receiving information of network domains where all hosts in the blockchain are located, and generating a first network topology involved in cross-domain forwarding according to the information of the network domains, wherein nodes in the first network topology are the hosts in the blockchain, and a connection line between two of the nodes indicates that two corresponding ones of the hosts exist in the same network domain;

serving one of the hosts sending a broadcast message as a master node, splitting each of the nodes in the first network topology except the master node into an ingress node of a corresponding node and an egress node of the corresponding node, and connecting a connection line from the ingress node of the corresponding node to the egress node of the corresponding node;

splitting a connection line between two of the nodes in the first network topology into two directed connection lines, wherein each direction is from the egress node of one of the two of the nodes to the ingress node of the other of the two of the nodes, and capacity is N−1; when a connection line exists between the master node in the first network and one of other nodes, the connection line is transformed into a connection line with capacity N−1 from the master node to the ingress node of the one of the other nodes; and adding a virtual node, and adding a connection line with capacity 1 between the egress node of each of the nodes to the virtual node to form a second network topology;

performing, according to capacity C of a connection between two corresponding ones of the nodes, augmenting path searches with capacity 1 for N−1 times from the master node to the virtual node in the second network topology to obtain a search path, wherein N is a number of the nodes in the first network topology; and the virtual node in the search path is removed, and the ingress node of the corresponding node and the egress node of the corresponding node are merged to obtain a routing path of the broadcast message from the master node to a target node; and sending, when the master node needs to send a message to the target node located in another domain, the message to the target node according to the routing path for processing.

7. A non-transitory computer-readable storage medium, including computer programs stored thereon, wherein the computer programs are executed by a processor to implement:

receiving information of network domains where all hosts in the blockchain are located, and generating a first network topology involved in cross-domain forwarding according to the information of the network domains, wherein nodes in the first network topology are the hosts in the blockchain, and a connection line between two of the nodes indicates that two corresponding ones of the hosts exist in the same network domain;

serving one of the hosts sending a broadcast message as a master node, splitting each of the nodes in the first network topology except the master node into an ingress node of a corresponding node and an egress node of the corresponding node, and connecting a connection line from the ingress node of the corresponding node to the egress node of the corresponding node;

splitting a connection line between two of the nodes in the first network topology into two directed connection lines, wherein each direction is from the egress node of one of the two of the nodes to the ingress node of the other of the two of the nodes, and capacity is N−1; when a connection line exists between the master node in the first network and one of other nodes, the connection line is transformed into a connection line with capacity N−1 from the master node to the ingress node of the one of the other nodes; and adding a virtual node, and adding a connection line with capacity 1 between the egress node of each of the nodes to the virtual node to form a second network topology;

performing, according to capacity C of a connection between two corresponding ones of the nodes, augmenting path searches with capacity 1 for N−1 times from the master node to the virtual node in the second network topology to obtain a search path, wherein N is a number of the nodes in the first network topology; and the virtual node in the search path is removed, and the ingress node of the corresponding node and the egress node of the corresponding node are merged to obtain a routing path of the broadcast message from the master node to a target node; and sending, when the master node needs to send a message to the target node located in another domain, the message to the target node according to the routing path for processing.

8. The computer device of claim 6, wherein C=(L+U)/2, L represents a lower bound of an edge capacity, U represents an upper bound of the edge capacity, an initial value of L is 0, and an initial value of U is N−1;

before the performing, according to the capacity C of the connection between the two corresponding ones of the nodes, augmenting path searches with capacity 1 for N−1 times from the master node to the virtual node in the second network topology, the processor is further configured to execute the computer programs to implement:

obtaining a maximum flow f from the master node to the virtual node in the second network topology; updating, when f=N−1, U=C; otherwise, updating L=C; and calculating a value of C again according to C=(L+U)/2; and controlling, when U−L≤1, C=U to be as a minimum network load of a corresponding one of the nodes; and otherwise, performing the step of obtaining the maximum flow f from the master node to the virtual node in the second network topology.

9. The computer device of claim 6, wherein the sending the message to the target node according to the routing path for processing comprises:

appending the routing path to an end of the message by the master node and sending the message to a first node in the routing path;

when a node located in the path receives the message, the node checks whether the message contains the routing path; and if yes, a next node in the routing path is obtained and the message is sent to the next node; and when the target node receives the message and the target node finds out that it is a last node in the routing path, the target node processes content of the message.

10. The computer device of claim 6, wherein the information of the network domains is stored in a configuration file in a form of network domains or IP addresses; and when a network domain of at least one of the nodes changes, the information of the network domains is updated by changing the configuration file.

11. The computer device of claim 6, wherein a stored form of the routing path is node name: node name.

12. The non-transitory computer-readable storage medium of claim 7, wherein C=(L+U)/2, L represents a lower bound of an edge capacity, U represents an upper bound of the edge capacity, an initial value of L is 0, and an initial value of U is N−1;

before the performing, according to the capacity C of the connection between the two corresponding ones of the nodes, augmenting path searches with capacity 1 for N−1 times from the master node to the virtual node in the second network topology, the processor is further configured to execute the computer programs to implement:

obtaining a maximum flow f from the master node to the virtual node in the second network topology; updating, when f=N−1, U=C; otherwise, updating L=C; and calculating a value of C again according to C=(L+U)/2; and controlling, when U−L≤1, C=U to be as a minimum network load of a corresponding one of the nodes; and otherwise, performing the step of obtaining the maximum flow f from the master node to the virtual node in the second network topology.

13. The non-transitory computer-readable storage medium of claim 7, wherein the sending the message to the target node according to the routing path for processing comprises:

appending the routing path to an end of the message by the master node and sending the message to a first node in the routing path;

when a node located in the path receives the message, the node checks whether the message contains the routing path; and if yes, a next node in the routing path is obtained and the message is sent to the next node; and when the target node receives the message and the target node finds out that it is a last node in the routing path, the target node processes content of the message.

14. The non-transitory computer-readable storage medium of claim 7, wherein the information of the network domains is stored in a configuration file in a form of network domains or IP addresses; and when a network domain of at least one of the nodes changes, the information of the network domains is updated by changing the configuration file.

15. The non-transitory computer-readable storage medium of claim 7, wherein a stored form of the routing path is node name: node name.

\* \* \* \* \*